(12) United States Patent
Hashimoto et al.

(10) Patent No.: US 9,342,822 B2
(45) Date of Patent: May 17, 2016

(54) DISPLAY CONTROL SYSTEM, DISPLAY CONTROL METHOD, DOCUMENT EXTRACTING DEVICE, PORTABLE INFORMATION TERMINAL, AND INFORMATION STORAGE MEDIUM

(71) Applicant: Kabushiki Kaisha Yaskawa Denki, Kitakyushu-shi, Fukuoka (JP)

(72) Inventors: Ayaka Hashimoto, Kitakyushu (JP); Tadashi Okubo, Kitakyushu (JP); Shinichi Ishikawa, Kitakyushu (JP)

(73) Assignee: KABUSHIKI KAISHA YASKAWA DENKI, Kitakyushu-Shi, Fukuoka (JP)

( * ) Notice: Subject to any disclaimer, the term of this patent is extended or adjusted under 35 U.S.C. 154(b) by 0 days.

(21) Appl. No.: 14/526,546

(22) Filed: Oct. 29, 2014

(65) Prior Publication Data

US 2015/0120606 A1    Apr. 30, 2015

(30) Foreign Application Priority Data

Oct. 29, 2013 (JP) ................................ 2013-224372

(51) Int. Cl.
| | |
|---|---|
| G06F 19/00 | (2011.01) |
| G06Q 10/00 | (2012.01) |
| H04L 29/08 | (2006.01) |
| G06Q 30/00 | (2012.01) |
| G06F 17/30 | (2006.01) |

(52) U.S. Cl.
CPC .......... *G06Q 10/20* (2013.01); *G06F 17/30011* (2013.01); *G06F 17/30725* (2013.01); *G06Q 30/016* (2013.01); *H04L 67/10* (2013.01)

(58) Field of Classification Search
CPC .. G06Q 10/087; G06Q 10/0875; G06Q 10/20
USPC .................. 235/385, 380, 383, 462.09, 462.1
See application file for complete search history.

(56) References Cited

U.S. PATENT DOCUMENTS

| | | | | |
|---|---|---|---|---|
| 7,225,399 | B2 * | 5/2007 | Watson ................. | G06F 17/218 715/210 |
| 8,060,400 | B2 * | 11/2011 | Wellman .............. | G06D 1/0282 235/375 |
| 8,400,530 | B2 * | 3/2013 | Ikeda ................... | H04N 1/0007 235/375 |
| 2005/0011957 | A1 | 1/2005 | Attia | |
| 2013/0115923 | A1 | 5/2013 | Earl | |
| 2014/0289289 | A1 * | 9/2014 | Fujioka ................ | G06F 9/4446 707/827 |

FOREIGN PATENT DOCUMENTS

| | | |
|---|---|---|
| EP | 1956500 A1 | 8/2008 |
| JP | 2002-222200 A | 8/2002 |

OTHER PUBLICATIONS

European Search Report for corresponding Application No. 14190592.7 dated Apr. 23, 2015.

* cited by examiner

*Primary Examiner* — Daniel St Cyr
(74) *Attorney, Agent, or Firm* — Hubbs, Enatsky & Inoue PLLC

(57) ABSTRACT

An identification information obtaining unit obtains identification information which is assigned in order to identify an industrial machine. An extraction target identifying unit identifies as an extraction target a portion of the document information accumulated in advance, based on the identification information. An extracting unit extracts the extraction target from the document information. A display unit displays what is extracted by the extracting unit.

9 Claims, 12 Drawing Sheets

FIG.5

| SERIAL NUMBER | | | D0075D683110001 |
|---|---|---|---|
| OWNER DATA | | | AA CORPORATION |
| PRODUCT INFORMA-TION | MAKER AREA | PRODUCT NAME DATA | XX SERVO SUPER |
| | | MODEL DATA | SGDV-AAAAAA00000 |
| | | PRODUCT DESCRIPTION DATA | XX SERVO SUPER 100V 100W |
| | | MANUFACTURED DATE DATA | 10/3/2013 |
| | | MANUFACTURED LOCATION DATA | TOKYO FACTORY |
| | | FIRMWARE VERSION DATA | 0001.0001A |
| | | FUNCTION NAME DATA | TUNING-LESS FUNCTION |
| | USER AREA | FACILITY NAME DATA | ･････ |
| | | DEVICE NAME DATA | ･････ |
| | | USE DATA | ･････ |
| | | PROFILE NAME DATA | DEVICE A X-AXIS PARAMETER SETTING |

FIG.7

| IDENTIFICATION CONDITION DATA | | IDENTIFICATION TARGET DATA | |
|---|---|---|---|
| PRODUCT NAME DATA | FIRMWARE VERSION DATA | DOCUMENT NAME DATA | PORTION IDENTIFICATION DATA |
| XX SERVO SUPER | 0001.0001A | XX SERVO MAINTENANCE MANUAL | COMMON SECTION INDIVIDUAL SECTION (0001.0001A) |

DISPLAY CONTROL SYSTEM, DISPLAY CONTROL METHOD, DOCUMENT EXTRACTING DEVICE, PORTABLE INFORMATION TERMINAL, AND INFORMATION STORAGE MEDIUM

CROSS-REFERENCE TO RELATED APPLICATIONS

The present disclosure contains subject matter related to that disclosed in Japanese Priority Patent Application JP 2013-224372 filed in the Japan Patent Office on Oct. 29, 2013, the entire contents of which are hereby incorporated by reference.

BACKGROUND OF THE INVENTION

1. Field of the Invention

The present invention relates to a display control system, a display control method, a document extracting device, a portable information terminal, and an information storage medium.

2. Description of the Related Art

In Japanese Patent Application Laid-open No. 2002-222200, there is disclosed an instruction manual presenting device with which, when a customer scans a bar code that is associated with an unit constituting a device, an instruction manual of the unit is displayed on a customer-side terminal.

SUMMARY OF THE INVENTION

According to one aspect of the present invention, there is provided a display control system, including: an identification information obtaining unit for obtaining identification information which is assigned in order to identify an industrial machine; an extraction target identifying unit for identifying as an extraction target a portion of document information accumulated in advance, based on the identification information; an extracting unit for extracting the extracting target from the document information; and a display unit for displaying what is extracted by the extracting unit.

According to one aspect of the present invention, there is provided a display control system, including: a document extracting device; and a portable information terminal, and the portable information terminal includes: an identification information obtaining unit for obtaining identification information which is assigned in order to identify an industrial machine; a serial information identifying unit for identifying, based on the obtained identification information, serial information which is assigned uniquely to the industrial machine; and a serial information transmitting unit for transmitting the serial information to the document extracting device, the document extracting device includes: a serial information receiving unit for receiving the serial information from the portable information terminal; an extraction target identifying unit for identifying as an extraction target a portion of document information accumulated in advance, based on the serial information; and an extracting unit for identifying the extraction target from the document information and transmitting the extraction target to the portable information terminal, and the portable information terminal further includes a display unit for displaying what is extracted by the extracting unit.

According to one aspect of the present invention, there is provided a display control method, including: obtaining identification information which is assigned in order to identify an industrial machine; identifying as an extraction target a portion of document information accumulated in advance, based on the identification information; extracting the extracting target from the document information; and displaying what is extracted.

According to one aspect of the present invention, there is provided a document extracting device, including: an extraction target identifying unit for identifying, as an extraction target, in response to obtainment of identification information assigned to an industrial machine, a portion of document information accumulated in advance, based on the identification information; and an extracting unit for extracting the extracting target from the document information.

According to one aspect of the present invention, there is provided a portable information terminal, including: an identification information obtaining unit for obtaining identification information which is assigned in order to identify an industrial machine; a serial information identifying unit for identifying, based on the obtained identification information, serial information which is assigned uniquely to the industrial machine; a serial information transmitting unit for transmitting the serial information to a document extracting device; and a display unit for displaying a portion of document information accumulated in advance that is extracted by the document extracting device based on the serial information.

According to one aspect of the present invention, there is provided a computer-readable information storage medium having stored thereon a program for causing a computer to function as: an extraction target identifying unit for identifying, as an extraction target, in response to obtainment of identification information assigned to an industrial machine, a portion of document information accumulated in advance, based on the identification information; and an extracting unit for extracting the extracting target from the document information.

According to one aspect of the present invention, there is provided a computer-readable information storage medium having stored thereon a program for causing a computer to function as a portable information terminal including a display unit, the program causing the computer to function as: an identification information obtaining unit for obtaining identification information which is assigned in order to identify an industrial machine; a serial information identifying unit for identifying, based on the obtained identification information, serial information which is assigned uniquely to the industrial machine; a serial information transmitting unit for transmitting the serial information to a document extracting device; and a display processing unit for displaying on the display unit a portion of document information accumulated in advance that is extracted by the document extracting device based on the serial information.

BRIEF DESCRIPTION OF THE DRAWINGS

FIG. 5 is a table showing an example of a product information database.

FIG. 7 is table showing an example of a correspondence relation information database.

DESCRIPTION OF THE EMBODIMENTS

Now, an embodiment of the present invention is described in detail with reference to the drawings.

Figure 1:
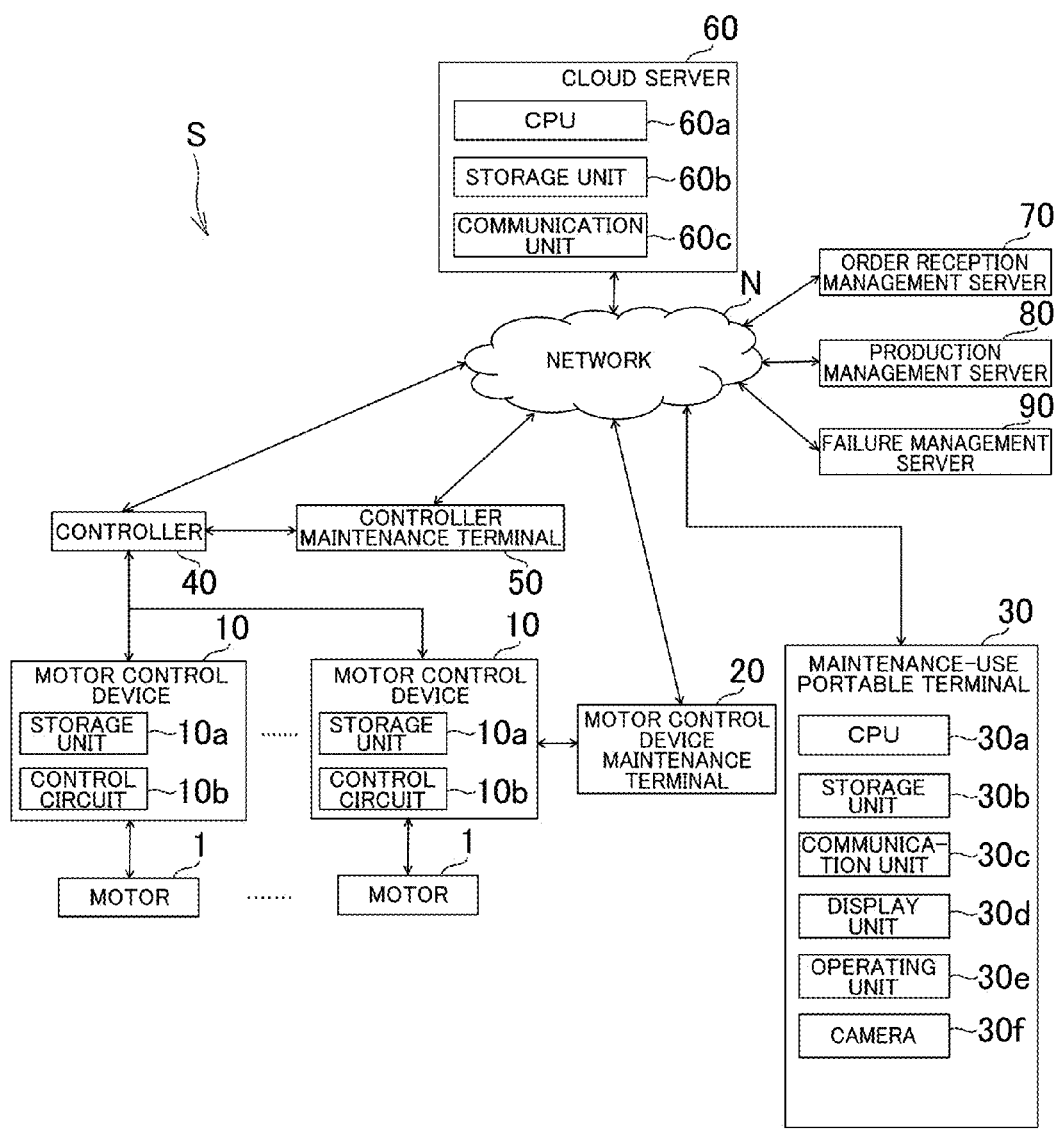
FIG. 1 is a diagram illustrating an example of the overall configuration of a display control system according to an embodiment of the present invention.

FIG. 1 is a diagram illustrating an example of the overall configuration of a display control system according to the embodiment of the present invention. As illustrated in FIG. 1, the display control system, which is denoted by S, includes a plurality of motors 1, a plurality of motor control devices 10, a motor control device maintenance terminal 20, a maintenance-use portable terminal 30, a controller 40, a controller maintenance terminal 50, a cloud server 60, an order reception management server 70, a production management server 80, and a failure management server 90. The motor control device maintenance terminal 20, the maintenance-use portable terminal 30, the controller 40, the controller maintenance terminal 50, the cloud server 60, the order reception management server 70, the production management server 80, and the failure management server 90 are connected to one another in a manner that allows for data transmission to and data reception from one another via a network N.

This embodiment is described by taking as an example a case where the display control system S is used by a maker who sells, and provides aftercare for, various products related to motor control (the motor control devices, the controller, and the like) and by users who purchase and use these products. For instance, users possess their respective motors 1, their respective motor control devices 10, the motor control device maintenance terminal 20, the maintenance-use portable terminal 30, the controller 40, and the controller maintenance terminal 50. The maker manages the cloud server 60, the order reception management server 70, the production management server 80, and the failure management server 90.

Identification information for identifying an industrial machine is assigned to the industrial machine of this embodiment which includes the controller 40, the motor control devices 10, and the motors 1. The identification information in this embodiment contains serial information which is assigned uniquely to each industrial machine, such as a serial number.

Each motor control device 10 includes a storage unit 10a and a control circuit 10b, and operates under command from the controller 40. The storage unit 10a includes a RAM, an EEPROM, or the like to store parameters and firmware for running the motor control device 10. The control circuit 10b controls the relevant motor 1 based on these parameters and firmware.

Figure 2:
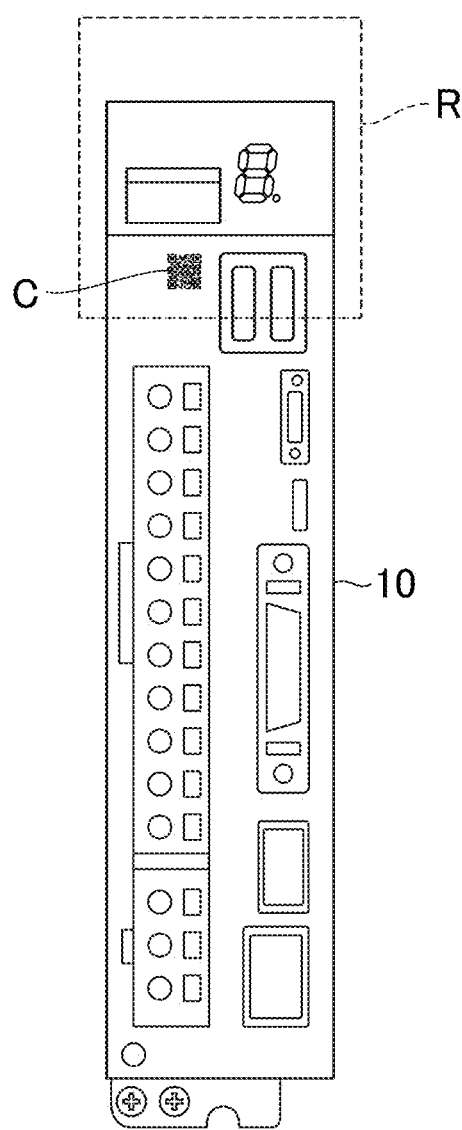
FIG. 2 is a frontal view of a motor control device according to the embodiment of the present invention.

FIG. 2 is a frontal view of one of the motor control devices 10 according to the embodiment of the present invention. As illustrated in FIG. 2, attached to an upper portion of each motor control device 10 according to this embodiment is a two-dimensional code C such as a QR code (trademark) that is associated with the serial number of the motor control device 10 in question.

The motor control device maintenance terminal 20 is a personal computer or other general computers that can be connected to the motor control devices 10. The motor control device maintenance terminal 20 is used by a user for maintenance work. For example, the motor control device maintenance terminal 20 writes a parameter specified by the user of each motor control device 10 in the storage unit 10a of the motor control device 10. The motor control device maintenance terminal 20 also downloads from the cloud server 60 firmware selected by the user of each motor control device 10 to install the firmware in the storage unit 10a of the motor control device 10, and updates the installed firmware. The motor control device maintenance terminal 20 in this embodiment is further capable of exerting control so that various types of information registered to the cloud server 60 are displayed.

The maintenance-use portable terminal 30 is a portable information terminal such as a smartphone or a tablet terminal, and includes a CPU 30a, a storage unit 30b, a communication unit 30c, a display unit 30d, an operating unit 30e, and a camera 30f. The storage unit 30a includes a RAM, a hard disk, and the like to store various programs and data. The CPU 30a executes various types of processing based on these programs and data. The communication unit 30c includes a wireless LAN module, various communication connectors, and the like to hold communication to and from other devices. The display unit 30d is a liquid crystal display or the like, and displays various screens upon instruction from the CPU 30a. The operating unit 30e is an input device such as a touch sensor or a button. In the maintenance-use portable terminal 30 of this embodiment, a liquid crystal display and a touch sensor is unitarily constructed as a touch panel. The camera 30f is a digital camera or the like and is used in this embodiment to, for example, photograph the two-dimensional code C attached to each motor control device 10. The maintenance-use portable terminal 30 also executes image analysis on the two-dimensional code C photographed with the camera 30f to identify the serial number or the like of the motor control device 10.

A user can perform the same maintenance work that is executed by the motor control device maintenance terminal 20 with the use of the maintenance-use portable terminal 30. This embodiment is also designed so that a user can download a manual from the cloud server 60 with the use of the maintenance-use portable terminal 30.

The controller 40 outputs to the motor control devices 10 upper-layer control commands for controlling their respective motors 1 so that the motor control devices 10 are controlled in an integrated manner.

The controller maintenance terminal 50 is a personal computer or the like. The controller maintenance terminal 50 is connected to the controller 40 and is used by a user for maintenance work. For example, the controller maintenance terminal 50 creates a program and a time chart executed by the controller 40 as instructed by a user, and displays various types of information registered to the cloud server 60.

The cloud server 60 is a server computer that manages various types of information used in the display control system S, and includes a CPU 60a, a storage unit 60b, and a communication unit 60c. The storage unit 60c includes a RAM, a hard disk, and the like to store various programs and data. The CPU 60a executes various types of processing based on these programs and data. The communication unit 60c includes a network card, various communication connectors, and the like to hold communication to and from other devices. The could server 60 manages, for example, personal information of each user, various types of information about products which are input by the user, and information about products and firmware carried by a maker.

The order reception management server 70 is a server computer that manages the situation of product order reception from the respective users.

The production management server 80 is a server computer that manages the production situation of each product an order for which has been received by the order reception management server 70.

The failure management server 90 is a server computer that manages failures in products that have been purchased by the respective users.

Programs and pieces of data described as being stored in the respective devices of the display control system S may be stored in information storage media connected to the devices, or may be obtained from external devices via the network N. The hardware configurations of the respective devices of the display control system S are not limited to the example given above, and pieces of common hardware can be used for the devices. The same applies to the devices of the display control system S for which a detailed description on hardware configuration is omitted for the sake of simplifying the description of the embodiment.

Figure 3:
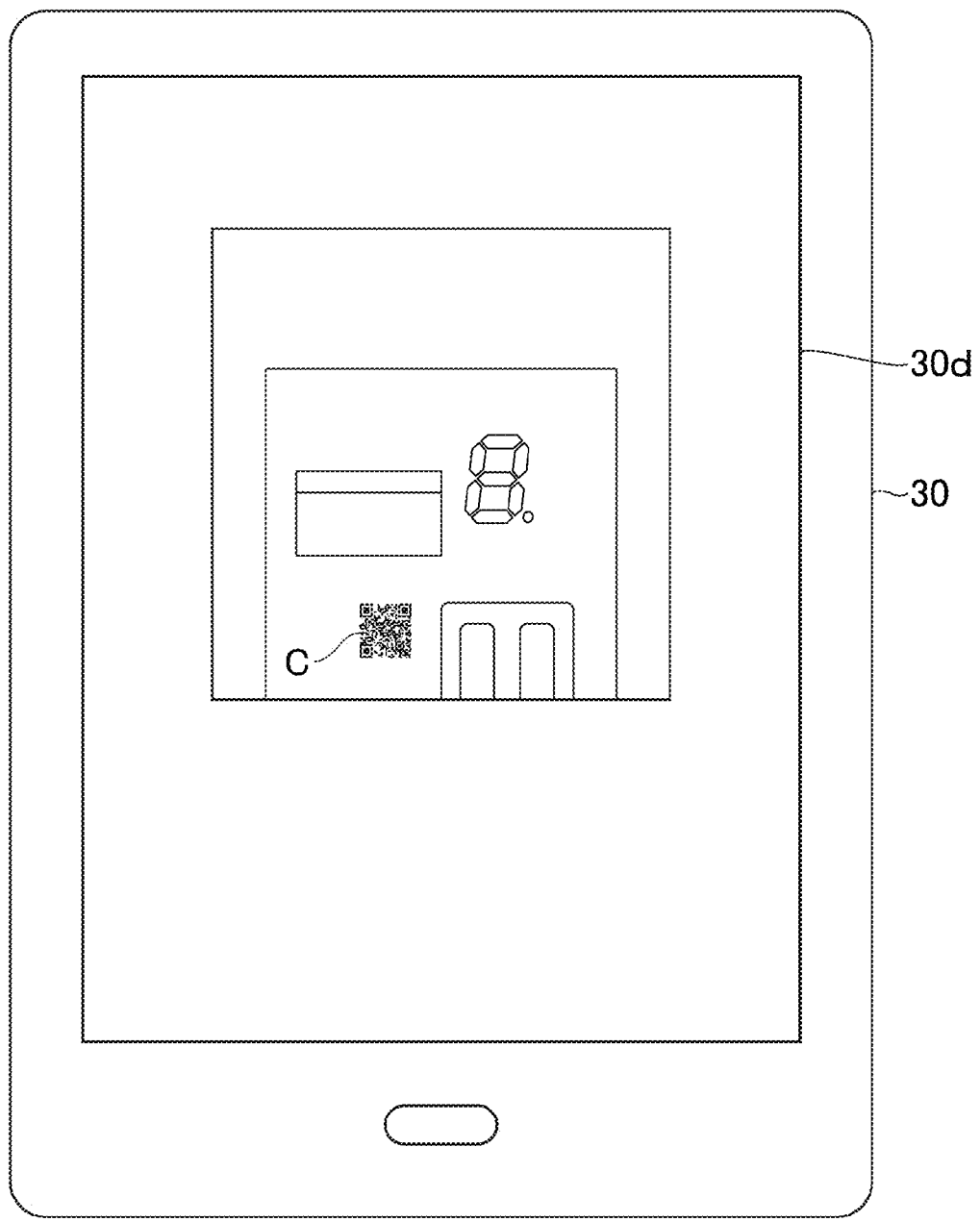
FIG. 3 is a diagram illustrating an example of a maintenance-use portable terminal on which a photographed screen is displayed.

In this embodiment, a user of the display control system S uses the camera 30f of the maintenance-use portable terminal 30 to photograph the two-dimensional code C attached to the relevant motor control device 10, for example. In this embodiment, when the user activates the camera 30f, for example, a photographed screen in which an image taken by performing given photographing operation is disposed is displayed on the display unit 30d of the maintenance-use portable terminal 30. The photographed screen, an example of which is illustrated in FIG. 3, is displayed on the display unit 30d of the maintenance-use portable terminal 30 in this embodiment when the user adjusts the position of the maintenance-use portable terminal 30 so that the angle of view of the camera 30f includes an area R, which takes up a portion of the back of the motor control device 10 illustrated in FIG. 2. The image disposed in the photographed screen is obtained and transmitted to the cloud server 60 when the user performs given photographing operation while the photographed screen of FIG. 3 is displayed on the maintenance-use portable terminal 30. The image is hereinafter referred to as photographed image. In this embodiment, the two-dimensional code C is disposed in the photographed image as illustrated in FIG. 3. Based on the two-dimensional code C disposed in the photographed image, the serial number of the motor control device 10 to which this two-dimensional code C is attached is identified in this embodiment. A serial number identified based on the two-dimensional code C that is disposed in a photographed image is hereinafter referred to as target number.

Figure 4:
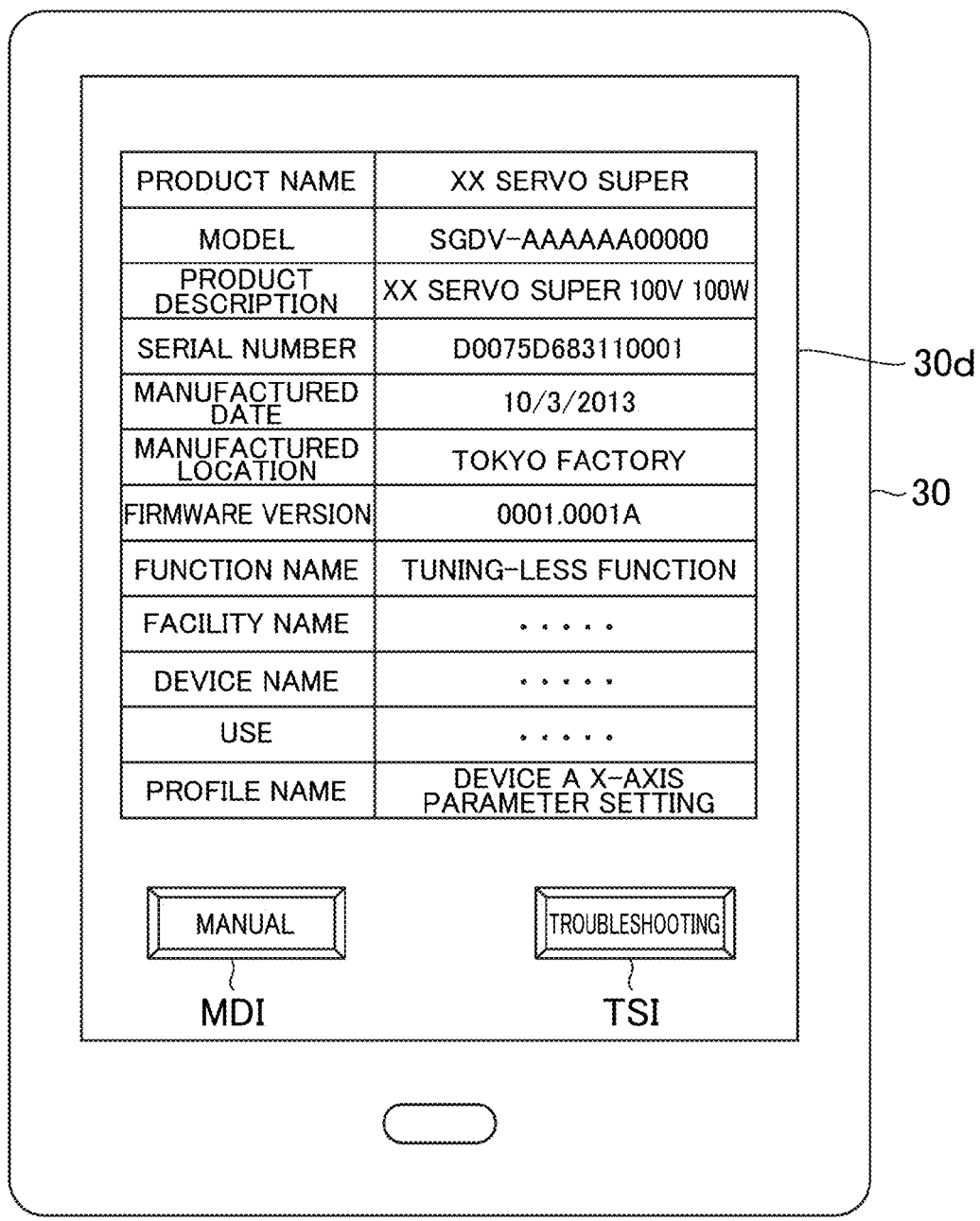
FIG. 4 is a diagram illustrating an example of the maintenance-use portable terminal on which a product information display screen is displayed.

When a photographed image is transmitted to the cloud server 60 in this embodiment, the photographed screen displayed on the maintenance-use portable terminal 30 transitions to a product information display screen, which is illustrated in FIG. 4.

The product information display screen of FIG. 4 is generated based on data stored in a product information database, an example of which is shown in FIG. 5. FIG. 5 is a table showing an example of the product information database. The product information database of FIG. 5 is stored on the cloud server 60 in this embodiment. As shown in FIG. 5, the product information database in this embodiment stores the serial number of a product, owner data which indicates who owns the product, and product information. The product information here includes a maker area which is a data area managed by a maker, and a user area which is data area managed by a user. A piece of the product information corresponds to a serial number on a one-to-one basis as shown in FIG. 5. A serial number may include other characters than numerical characters as shown in FIG. 5.

The maker area stores information unique to the product, for example, product name data, model data, product description data, manufactured date data, manufactured location data, firmware version data, and function name data. The product name data is, for example, data that indicates the product name of the product in question. The model data is, for example, data that indicates the model of the product. The product description data is, for example, data that indicates a description about the specifications or the like of the product. The manufactured date data is, for example, data that indicates the date of manufacture of the product. The manufactured location data is, for example, data that indicates the place of manufacture of the product. The firmware version data is, for example, data that indicates the version of firmware installed in the product. The function name data is, for example, data that indicates the name of at least one function implemented by firmware that is installed in the product. In this embodiment, firmware is created for each combination of functions whose names are indicated by the function name data, and a value of the firmware version data corresponds to a function whose name is indicated by the function name data. The value of the firmware version data and the value of the function name data are changed suitably when firmware is downloaded or installed. The rest of the information is information that does not change after the product is purchased, and therefore is not updated in principle.

Aside from firmware based on standard specifications, optional firmware for implementing a function that is not covered by the firmware based on standard specifications may be installed in the product. A plurality of values may be set as values of the firmware version data in this case, for example, a value that indicates a version number associated with the firmware based on standard specifications and a value that indicates a version number associated with the optional firmware. In the case of a product that has a plurality of pieces of optional firmware installed therein, a plurality of version numbers that correspond to the pieces of optional firmware may be set as values of the firmware version data. The function name data may also indicate the names of functions implemented by the optional firmware. In addition, the values of the firmware version data and the values of the function name data in this case may be changed suitably when the optional firmware is downloaded or installed.

The user area stores product information that is input by the user, for example, facility name data, device name data, use data, and profile name data. The facility name data is, for example, data that indicates the name of a facility where the product in question is used. The device name data is, for example, data that indicates the name of a device in which the product is used. The use data is, for example, data that indicates the use of the product. The profile name data is, for example, data that indicates the name of a file in which values of a group of parameters set to the product are written. The contents of the file may be stored in the user area. What items are to be input in the user area may be set freely and separately for each user.

An image that contains a target number and at least a portion of a piece of the product information that is associated with the target number is disposed in the product information display screen of FIG. 4. In this manner, product information of the motor control device 10 of interest is displayed on the maintenance-use portable terminal 30 in this embodiment by photographing the two-dimensional code C attached to the motor control device 10 with the maintenance-use portable terminal 30.

Figure 6:
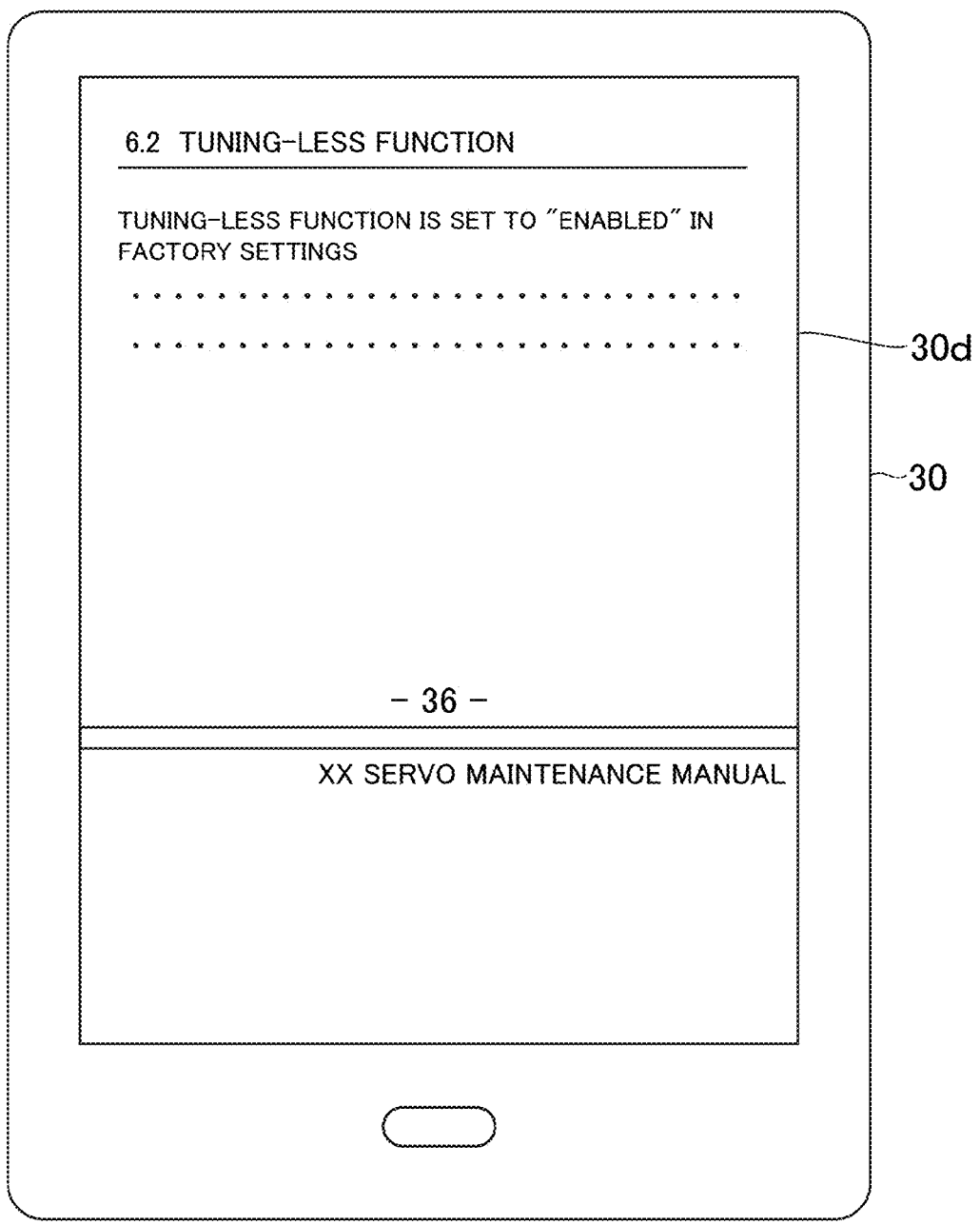
FIG. 6 is a diagram illustrating an example of the maintenance-use portable terminal on which a document information display screen is displayed.

A manual download icon MDI and a troubleshooting icon TSI are also disposed in the product information display screen of FIG. 4. These two icons are images that a user can tap on. When a user performs operation of tapping on the troubleshooting icon TSI, a message requesting troubleshooting of this motor control device 10 is transmitted to a given destination. When a user performs operation of tapping on the manual download icon MDI, on the other hand, the product information display screen displayed on the maintenance-use portable terminal 30 transitions to a document information display screen, which is illustrated in FIG. 6. FIG. 6 illustrates an image according to this embodiment which shows a portion of a manual of the motor control device 10 to which the two-dimensional code C of FIG. 2 is attached. The displayed portion is a portion in which a description about a version of firmware that is installed in this motor control device 10 is written.

Figure 8:
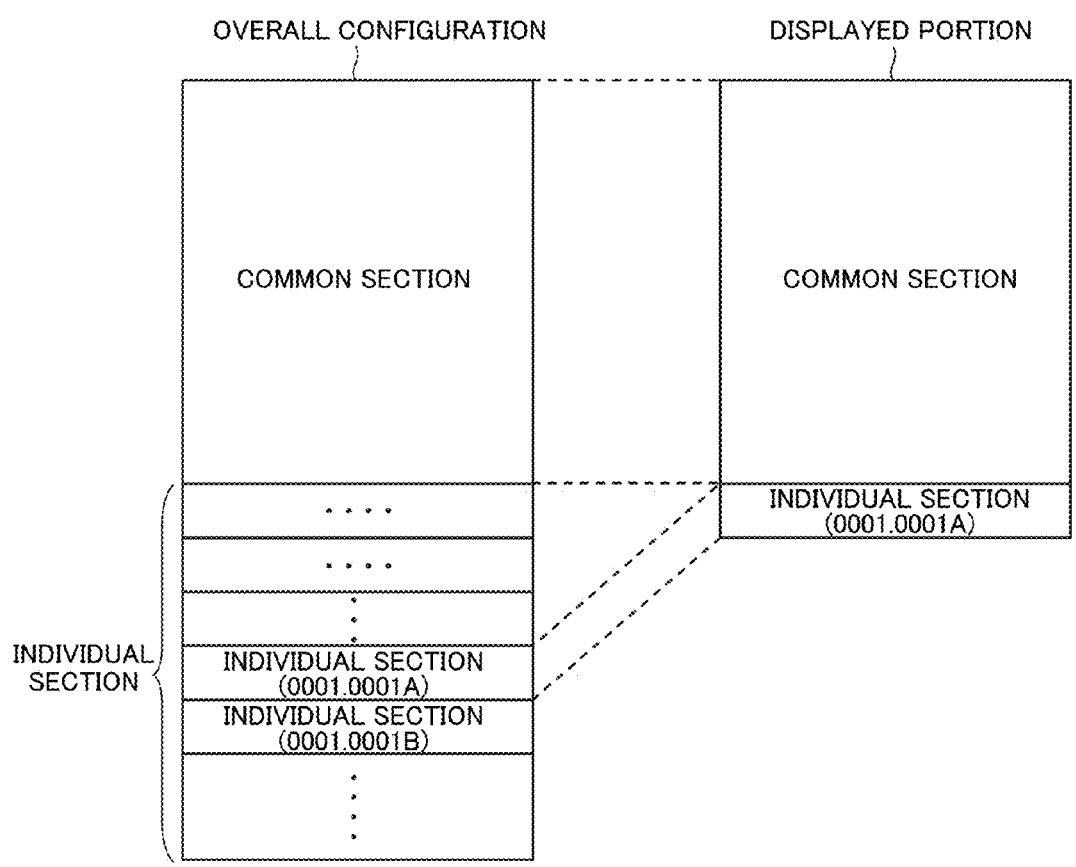
FIG. 8 is a diagram illustrating an example of the relation between the overall configuration of document information and a displayed portion of the document information.

In this embodiment, a piece of the document information to be displayed and a portion of the piece of the document information that is to be displayed are identified based on data that is stored in a correspondence relation information database, an example of which is shown in FIG. 7. FIG. 7 is a table showing an example of the correspondence relation information database. The correspondence relation information database of FIG. 7 is stored on the cloud server 60 in this embodiment. The correspondence relation information database stores data indicating a correspondence relation between identification condition data, which corresponds to data stored in the product information database, and identification target data, which corresponds to a piece of the document information to be displayed and a portion of the piece of the document information that is to be displayed. In the correspondence relation information database in this embodiment, a combination of a value of the product name data and a value of the firmware version data is set as a value of the identification condition data as shown in FIG. 7. A combination of document name data that indicates the name of a piece of the document information to be displayed and portion identification data for identifying a portion to be displayed is set as a value of the identification target data. In this embodiment, a manual which is an example of the document information includes a common section and a plurality of individual sections as illustrated in FIG. 8. The common section is shared by all versions of firmware to be installed. The individual sections correspond to different versions of firmware. In the example of FIG. 7, the portion identification data indicates the name of at least one section to be displayed. What is indicated by the portion identification data is not limited to the one given above, and the portion identification data may instead indicate, for example, the page number and line number of the head line displayed.

In this embodiment, a piece of the identification condition data that corresponds to a piece of the product information, which in turn is associated with a target number, is identified in the association relation information database. A piece of the identification target data that is associated with this piece of identification condition data is then obtained and a portion of a piece of the document information that is indicated by the piece of the identification target data in the correspondence relation information database is displayed. In the example of FIG. 7, the portion of the manual of FIG. 6 is identified based on the value of the product name data and the value of the firmware version data that are associated with a target number. The identified portion is what is illustrated as a displayed portion in FIG. 8. In the case where a plurality of values are set as values of the firmware version data as described above, a plurality of portions of a piece of the document information, such as a plurality of sections, that each corresponds to one of the firmware version data values in the correspondence relation information database may be identified and displayed.

In the manner described above, by photographing the two-dimensional code C attached to the motor control device 10 of interest, a portion of document information accumulated in advance that corresponds to the product information about this motor control device 10 is extracted and displayed in this embodiment.

The portion displayed in this embodiment is a portion of a manual for an industrial machine identified by the identification information of interest that contains a description about firmware installed in the industrial machine. The trouble of downloading a manual and then searching the manual for a portion that contains a description about firmware is thus reduced in this embodiment.

Figure 9:
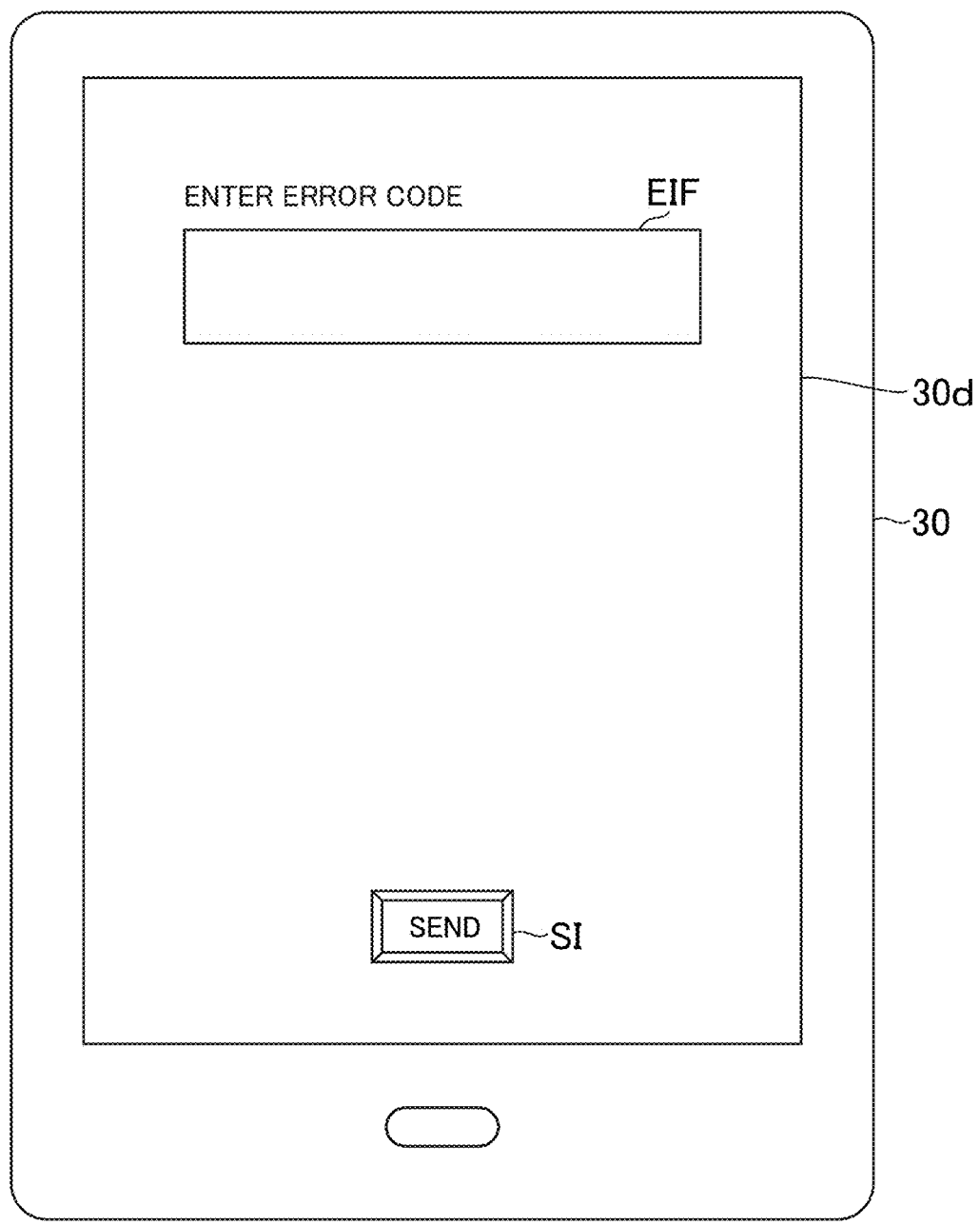
FIG. 9 is a diagram illustrating an example of the maintenance-use portable terminal on which an error code input screen is displayed.

The product information display screen of FIG. 4 may transition to an error code input screen, which is illustrated in FIG. 9, in response to the user's tapping operation that is performed on the manual download icon MDI while the product information display screen is displayed on the maintenance-use portable terminal 30. The error code input screen displayed on the maintenance-use portable terminal 30 may transition to the document information display screen when the user inputs an error code in an error code input form EIF, which is disposed in the error code input screen, and then taps on a "send" icon SI. In this case, a combination of a value of the product name data and an error code, for example, may be set as a value of the identification condition data in the correspondence relation information database. An image disposed in the document information display screen in the situation described above shows a portion of a manual that is associated with a combination of a value of the product name data associated with a target number and an error code that is input. The portion identification data in this case may indicate, for example, the page number and line number of a line in the manual at which the writing of the error code begins. In this mode, by photographing the two-dimensional code C that is attached to the motor control device 10 of interest and inputting an error code, a portion of a piece of the document information that is associated with a combination of product information about the motor control device 10 and the input error code is displayed. A portion that corresponds to a combination of an industrial machine whose identification information is obtained and an error code that is input can thus be extracted in this mode from the document information accumulated in advance.

The method of extracting a portion of document information described above is merely an example, and the present invention has no problem in using other extraction methods to extract a portion of document information.

A further description is given below on functions of the display control system S that are related to the extraction of a portion of document information and display control of the extracted portion, and processing executed in the display control system S.

Figure 10:
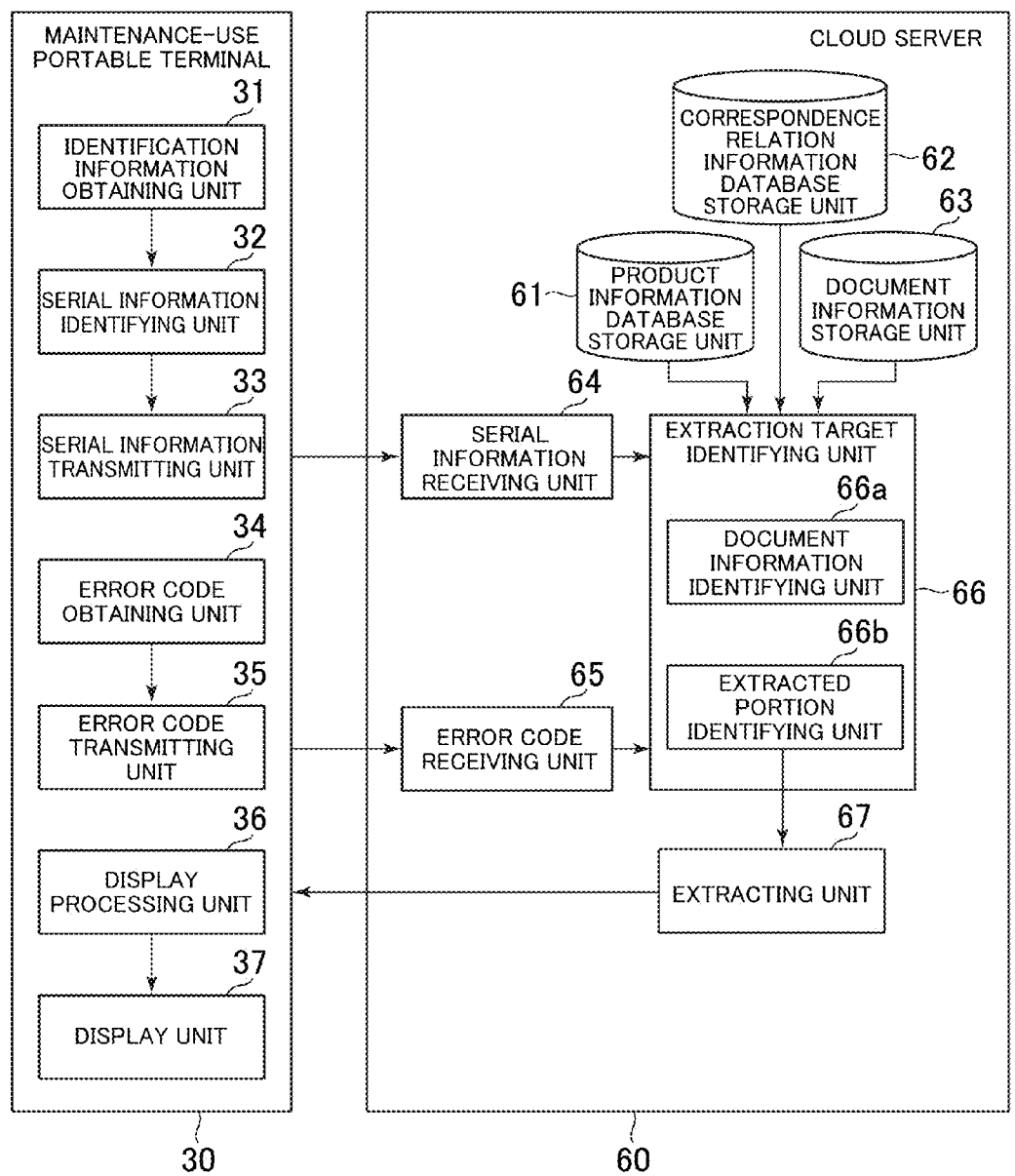
FIG. 10 is a function block diagram illustrating an example of functions that are implemented by a cloud server and the maintenance-use portable terminal according to the embodiment of the present invention.

FIG. 10 is a function block diagram illustrating an example of functions that are implemented by the cloud server 60 and maintenance-use portable terminal 30 according to this embodiment. The display control system S according to this embodiment does not need to implement all of the functions illustrated in FIG. 10, and may also implement other functions than those illustrated in FIG. 10.

As FIG. 10 illustrates an example, the cloud server 60 according to this embodiment includes, in terms of function, a product information database storage unit 61, a correspondence relation information database storage unit 62, a document information storage unit 63, a serial information receiving unit 64, an error code receiving unit 65, an extraction target identifying unit 66, and an extracting unit 67. The extraction target identifying unit 66 includes a document information identifying unit 66a and an extracted portion identifying unit 66b. The product information database storage unit 61, the correspondence relation information database storage unit 62, and the document information storage unit 63 are implemented mainly by the storage unit 60b. The serial information receiving unit 64 and the error code receiving unit 65 are implemented mainly by the communication unit 60c. The extraction target identifying unit 66 is implemented mainly by the CPU 60a. The extracting unit 67 is implemented mainly by the CPU 60a and the communication unit 60c. In this manner, the cloud server 60 takes the role of a document extracting device in this embodiment.

The functions given above are implemented in this embodiment by the CPU 60a of the cloud server 60 which is a computer by executing a program that is installed in the cloud server 60 and includes commands corresponding to the above-mentioned functions. This program is supplied to the cloud server 60 via a computer-readable information storage medium such as an optical disc, a magnetic disk, magnetic tape, a magneto-optical disk, or a flash memory, or via a computer network such as the Internet.

As FIG. 10 illustrates an example, the maintenance-use portable terminal 30 according to this embodiment includes, in terms of function, an identification information obtaining unit 31, a serial information identifying unit 32, a serial information transmitting unit 33, an error code obtaining unit 34, an error code transmitting unit 35, a display processing unit 36, and a display unit 37. The identification information obtaining unit 31 is implemented mainly by the CPU 30a and the camera 30f. The serial information identifying unit 32 is implemented mainly by the CPU 30a. The error code obtaining unit 34 is implemented mainly by the CPU 30a and the operating unit 30e. The serial information transmitting unit 33 and the error code transmitting unit 35 are implemented mainly by the communication unit 30c. The display processing unit 36 is implemented mainly by the CPU 30a. The display unit 37 is implemented mainly by the display unit 30d. In this manner, the maintenance-use portable terminal 30 takes the role of a portable information terminal in this embodiment.

The functions given above are implemented in this embodiment by the CPU 30a of the maintenance-use portable terminal 30 which is a computer by executing a program that is installed in the maintenance-use portable terminal 30 and includes commands corresponding to the above-mentioned functions. This program is supplied to the maintenance-use portable terminal 30 via a computer-readable information storage medium such as an optical disc, a magnetic disk, magnetic tape, a magneto-optical disk, or a flash memory, or via a computer network such as the Internet.

The product information database storage unit 61 of the cloud server 60 stores the product information database an example of which is shown in FIG. 5.

The correspondence relation information database storage unit 62 of the cloud server 60 stores the correspondence relation information database an example of which is shown in FIG. 7.

The document information storage unit 63 of the cloud server 60 stores at least one type of document information such as manuals for an industrial machine. Pieces of document information are thus accumulated in advance on the cloud server 60 in this embodiment.

The identification information obtaining unit 31 of the maintenance-use portable terminal 30 obtains identification information that is assigned in order to identify an industrial machine. The identification information in this embodiment includes serial information assigned uniquely to each industrial machine, such as a serial number. An industrial machine to which identification information obtained by the identification information obtaining unit 31 is assigned can therefore be identified uniquely in this embodiment from among industrial machines to which the identification information is assigned. The identification information may include the model and the product name in addition to the serial information. The identification information obtaining unit 31 in this embodiment obtains the identification information in the form of an image as illustrated in FIG. 3. The identification information in this embodiment can thus be obtained by the simple operation of photographing the two-dimensional code C. A bar code or a serial number itself may be attached to an industrial machine, instead of the two-dimensional code C, so that the identification information obtaining unit 31 obtains the identification information by photographing the bar code or the serial number. The specifics of the user's input operation may be obtained as at least a portion of the identification information. Alternatively, a radio frequency identification (RFID) tag which stores identification information and, when receiving an inquiry signal from the maintenance-use portable terminal 30, transmits a response signal that includes the identification information as a radio signal may be attached to each industrial machine. In this case, the identification information obtaining unit 31 of the maintenance-use portable terminal 30 which has a function of transmitting an inquiry signal may obtain the identification information by receiving the radio signal sent from the RFID tag.

The serial information identifying unit 32 of the maintenance-use portable terminal 30 identifies serial information which is uniquely assigned to each industrial machine, based on the identification information obtained by the identification information obtaining unit 31. The serial information identifying unit 32 in this embodiment performs image analysis on the two dimensional code C which is disposed in a photographed image obtained by the identification information obtaining unit 31, thereby identifying the serial number of the motor control device 10 to which this two-dimensional code C is attached.

The serial information transmitting unit 33 of the maintenance-use portable terminal 30 transmits to the cloud server 60 the serial information identified by the serial information identifying unit 32.

The serial information receiving unit 64 of the cloud server 60 receives the serial information from the maintenance-use portable terminal 30.

The error code obtaining unit 34 of the maintenance-use portable terminal 30 obtains an error code of an industrial machine. The error code obtaining unit 34 in this embodiment obtains, for example, an error code that is input by the user in the error code input form EIF, which is disposed in the error code input screen of FIG. 9. The error code obtaining unit 34 may obtain an error code in the form of an image as is the case for the identification information. For instance, an error code may be obtained by photographing the error code that is being displayed. The identification information and an error code may both be obtained at once as an image by photographing the two-dimensional code C and the error code both.

The error code transmitting unit 35 of the maintenance-use portable terminal 30 transmits to the cloud server 60 the error code obtained by the error code obtaining unit 34.

The error code receiving unit 65 of the cloud server 60 receives the error code transmitted by the error code transmitting unit 35.

The extraction target identifying unit 66 of the cloud server 60 identifies, as an extraction target, a portion of document information accumulated in advance, based on the identification information obtained by the identification information obtaining unit 31. The extraction target identifying unit 66 in this embodiment refers to the correspondence relation information database an example of which is shown in FIG. 7, and identifies in the manner described above a piece of the document information and a portion of the piece of the document information that are to be extracted based on the serial information received by the serial information receiving unit 64.

The extraction target identifying unit 66 may extract a portion of a piece of the document information that contains a description about software such as firmware installed in an industrial machine that is associated with the obtained identification information as described above. The user in this case does not need to find out which software is installed in the industrial machine to which this identification information is assigned to view a description about software installed in the industrial machine.

The document information identifying unit 66a may identify, based on the obtained identification information, a piece of document information that is a manual for an industrial machine that corresponds to this identification information. The extracted portion identifying unit 66b then identifies a portion of this piece of document information as an extraction target. The extracted portion identifying unit 66b may identify as an extraction target a portion of the piece of document information that contains a description about software such as firmware installed in the industrial machine that corresponds to the identification information as described above. In this way, the user has less trouble in searching for a manual for an industrial machine to which the identification information of interest is assigned and a portion of the manual that contains a description about software installed in the industrial machine.

The extracted portion identifying unit 66b may identify the function of software that is installed in an industrial machine based on the identification information. The extracted portion identifying unit 66b in this case identifies, for example, a value of the function name data that is associated with a target number of interest in the production information database. The extracted portion identifying unit 66b then identifies as an extraction target a portion of a manual identified by the document information identifying unit 66a that contains a description related to the identified function. A function name that corresponds to a value of the function name data, for example, is set as a value of the identification condition data of the correspondence relation information database in this case. In this way, the user can view a description related to the function of software installed in an industrial machine to which the identification information is assigned without finding out the function of the software. The correspondence relation between a value of the firmware version data and a function implemented by the firmware may be managed in the product information database so that the extracted portion identifying unit 66b identifies the function of software that is installed in an industrial machine based on the value of the firmware version data.

The extraction target identifying unit 66 may identify as an extraction target a portion of document information that is identified based on registration information registered by a user of an industrial machine and that is stored in the product information database storage unit 61 in association with the identification information. An example of the registration information here is information stored in the user area. In this way, a user can set information suitable for the user's need as information that is to be extracted in response to the obtainment of the identification information. The extraction target identifying unit 66 may also identify an extraction target based on, for example, the values of a group of parameters written in a file whose name is indicated by a piece of the profile name data that corresponds to an identified serial number.

The extraction target identifying unit 66 may identify as an extraction target a portion of the document information that is identified based on the combination of the identification information in question and an obtained error code as described above. In this way, a portion of document information accumulated in advance that corresponds to the combination of an industrial machine whose identification information is obtained and an error code that is input can be extracted as described above.

The extracting portion 67 of the cloud server 60 extracts from the document information an extraction target identified by the extraction target identifying unit 66. The extracting unit 67 may transmit, in addition to extracting the extraction target from the document information, the extraction target to the maintenance-use portable terminal 30. When transmitting the extraction target, the extracting unit 67 may transmit, for example, an identified piece of the document information and the portion identification data that corresponds to the identification condition data identified based on the target number in question in the correspondence relation information database. The extracting unit 67 may also transmit a portion that is indicated by this portion identification data and that is cut out of the piece of the document information, for example, at least one section cut out of a manual whose name is indicated by the portion identification data.

The display processing unit 36 of the maintenance-use portable terminal 30 displays on the display unit 37 a portion of document information accumulated in advance that is extracted by the cloud server 60 based on the serial information. The display processing unit 36 in this embodiment receives information that has been transmitted from the extracting portion 67 and displays on the display unit 37 the document information display screen in which an image corresponding to the transmitted information is disposed, for example. In the case where the display processing unit 36 receives, for example, a piece of the document information and the portion identification data, the display processing unit 36 may exert control so that the display unit 37 displays a portion of the piece of the document information that is indicated by this portion identification data. When the portion identification data indicates the name of at least one section, for example, the display unit 37 may be controlled so that the at least one section is cut out and displayed. When the portion identification data indicates the page number and line number of at least one section, on the other hand, for example, the display unit 37 may be controlled so as to display a portion on a page that corresponds to the indicated page number that is headed with a line that corresponds to the indicated line number. In the case where a portion (e.g., at least one section) of a piece of the document information that is cut out by the extracting portion 67 is received, for example, the display processing unit 36 may exert control so that the received portion is displayed.

The display unit 37 of the maintenance-use portable terminal 30 displays what is extracted by the extracting unit 67. The display unit 37 in this embodiment displays extracted information which is displayed under control of the display processing unit 36.

In this embodiment, a portion of predetermined document information that corresponds to the identification information that has been obtained is identified as an extraction target. The identified extraction target is then extracted from the document information. Document information accumulated in advance is accessed and a portion of the document information that is needed with respect to an individual industrial machine can thus be extracted in this embodiment.

Figure 11:
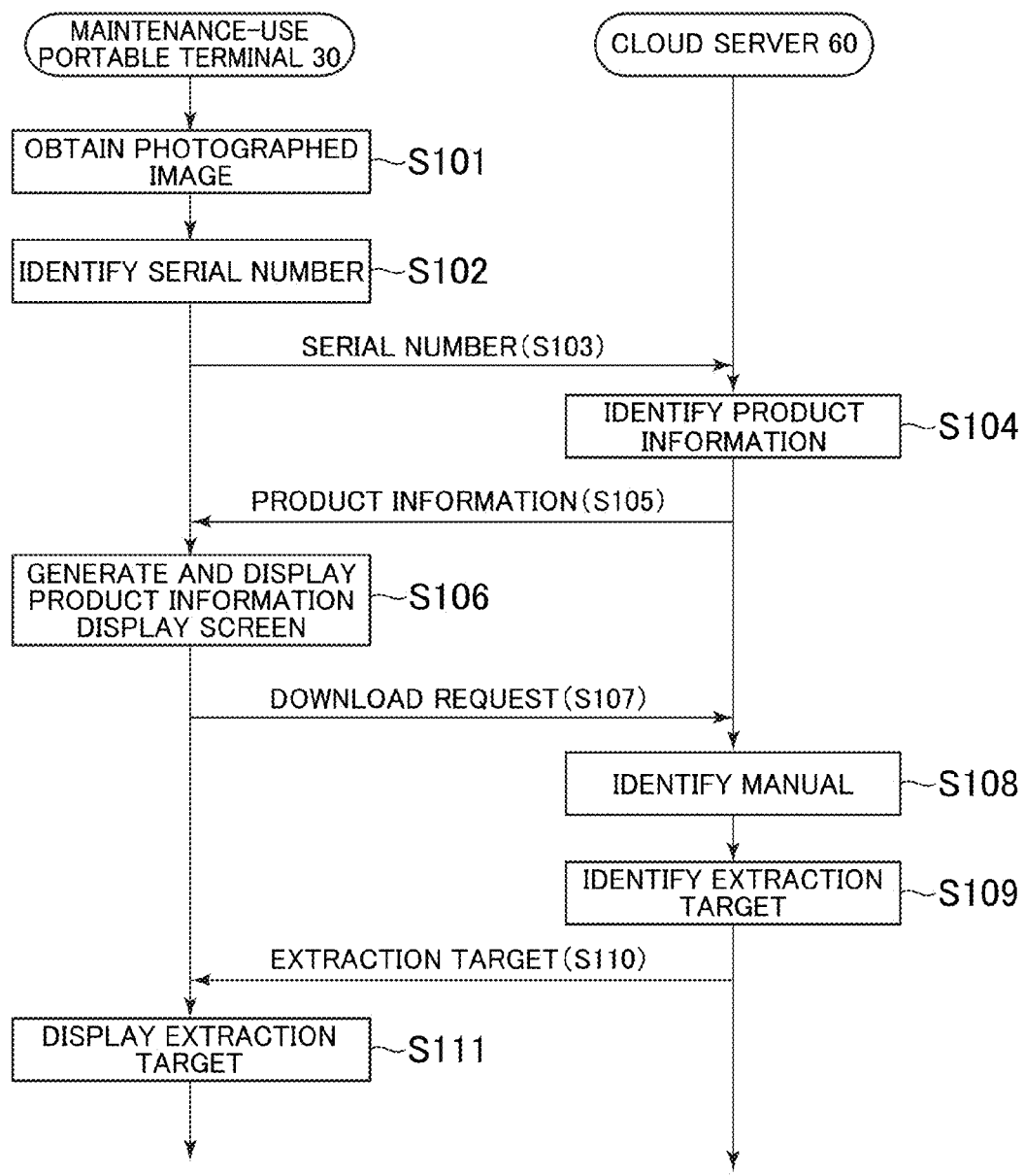
FIG. 11 is a flow chart illustrating an example of the flow of processing that is executed on the cloud server and the maintenance-use portable terminal according to the embodiment of the present invention.

An example of processing that is executed on the cloud server 60 and maintenance-use portable terminal 30 according to this embodiment in response to the photographing of a photographed image is now described with reference to a flow chart of FIG. 11.

When a photographed image is photographed, the identification information obtaining unit 31 obtains this photographed image first (S101). The serial information identifying unit 32 then performs image analysis on the photographed image to identify a serial number that corresponds to the two-dimensional code C disposed in the photographed image (S102). The serial information transmitting unit 33 transmits the identified serial number to the cloud server 60, and the serial information receiving unit 64 receives the serial number (S103). The extraction target identifying unit 66 then identifies a piece of the product information that is associated with the received serial number in the product information database (S104). The extracting unit 67 transmits the identified piece of the product information to the maintenance-use portable terminal 30, and the display processing unit 36 receives the piece of the product information (S105). Based on the received piece of the product information, the display processing unit 36 generates, and displays on the display unit 37, the product information display screen an example of which is illustrated in FIG. 4 (S106).

When the user performs the operation of tapping on the manual download icon MDI at this point, the serial information transmitting unit 33 transmits to the cloud server 60 a request to download a manual that corresponds to the serial number transmitted in Step S103. The serial information receiving unit 64 receives the download request (S107). The extraction target identifying unit 66 identifies in the manner described above a portion of the manual that is to be extracted, based on the serial number received in Step S103. The extraction target identifying unit 66 here searches the correspondence relation information database for, for example, the identification condition data that corresponds to the piece of the product information that has been identified in Step S104, and identifies a portion of the manual that is indicated by the identification target data associated with this identification condition data. In this processing example, the document information identifying unit 66a identifies the manual to be extracted (S108) and the extracted portion identifying unit 66b identifies a portion of the identified manual as an extraction target (S109). The extracting unit 67 then transmits the extraction target identified in Step S109 to the maintenance-use portable terminal 30, and the display processing unit 36 receives the extraction target (S110). The display processing unit 36 displays the extraction target on the display unit 37 (S117), and then the processing of this processing example is ended.

Figure 12:
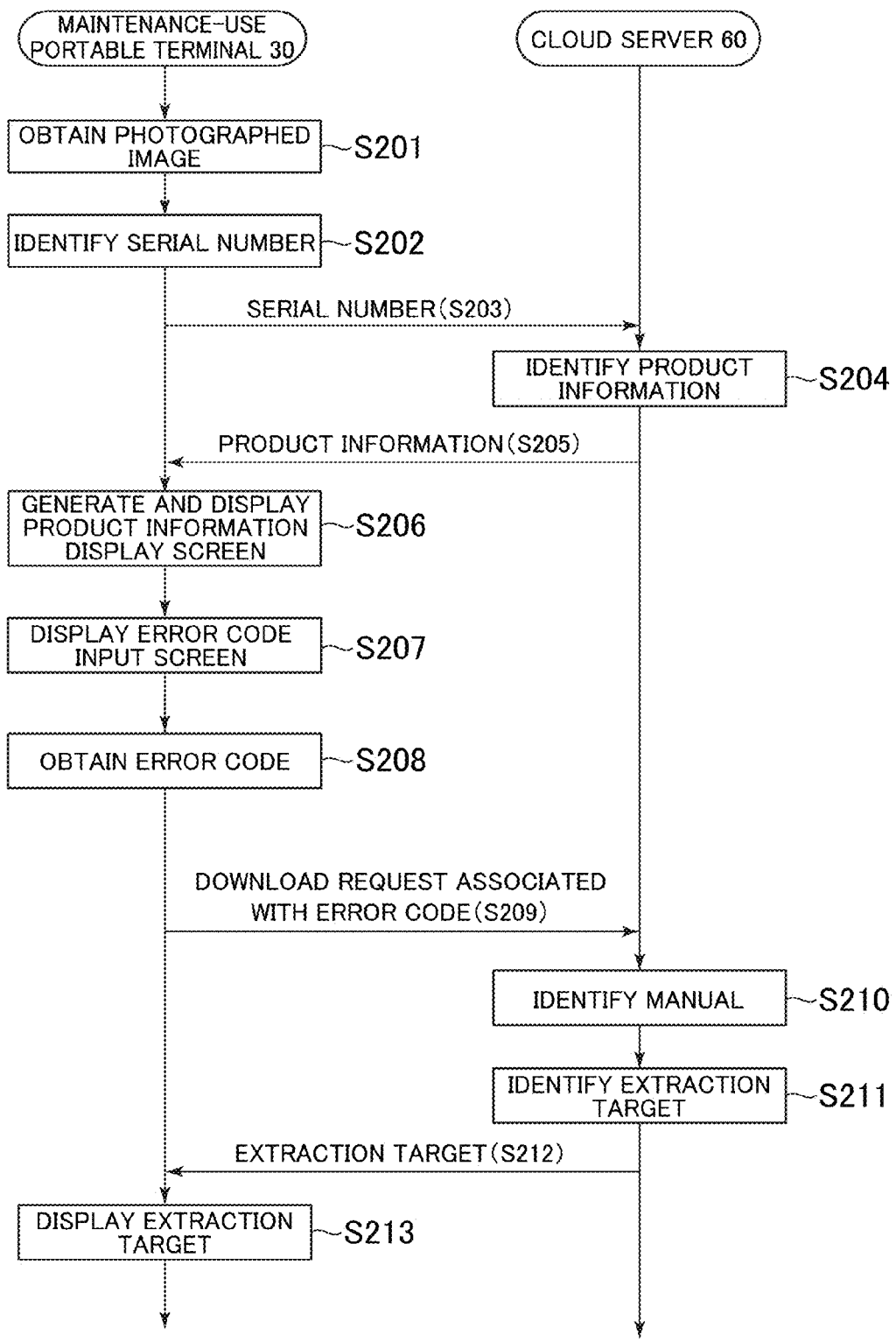
FIG. 12 is a flow chart illustrating another example of the flow of the processing that is executed on the cloud server and the maintenance-use portable terminal according to the embodiment of the present invention.

While the serial information alone is transmitted from the maintenance-use portable terminal 30 to the cloud server 60 in the processing example given above, the serial information and an error code are transmitted in some cases as described above. Another processing example is described with reference to a flow chart of FIG. 12 in regard to processing that is executed in such cases by the display control system S according to this embodiment in response to the photographing of a photographed image.

Steps S201 to S206 are the same as Steps 101 to S106, and a description thereof is omitted. In the case where the user performs the operation of tapping on the manual download icon MDI after Step S206 while the product information display screen is being displayed, the display processing unit 36 displays on the display unit 37 the error code input screen an example of which is illustrated in FIG. 9 (S207). When the user inputs an error code in the error code in the error code input form EIF which is disposed in the error code input screen at this point and taps on the send icon SI, the error code obtaining unit 34 obtains the error code (S208). The error code transmitting unit 35 transmits to the cloud server 60 a request to download a manual that is associated with the error code, and the error code receiving unit 65 receives the download request (S209).

The extraction target identifying unit 66 then identifies in the manner described above a portion of the manual that is to be extracted, based on the serial number received in Step S203 and the error code received in Step S209. The extraction target identifying unit 66 here searches the correspondence relation information database for, for example, the identification condition data associated with a combination of the piece of the product information that has been identified in Step S204 and the error code that has been received in Step S209, and identifies a portion of the manual that is indicated by the identification target data associated with this identification condition data. In this processing example, the document information identifying unit 66a identifies the manual to be extracted (S210) and the extracted portion identifying unit 66b identifies a portion of the identified manual as an extraction target (S211). The extracting unit 67 then extracts the extraction target identified in Step S211 from the document information and transmits the extraction target to the maintenance-use portable terminal 30, and the display processing unit 36 receives the extraction target (S212). The display processing unit 36 displays the extraction target on the display unit 37 (213), and then the processing of this processing example is ended.

In Step S110 and in Step S212, the extracting unit 67 may transmit a cut-out portion of the manual or may transmit the manual and the portion identification data as described above.

Data stored in the product information database is not limited to the one given in the above example. In the case where an encoder is connected to each motor control device 10 in order to detect the rotational position of the relevant motor 1, for example, the motor control device 10 may operate based on motor information (of which details are described later) stored in a memory of the encoder. In the case where no encoders are used, on the other hand, the motor information may be stored in the product information database.

The motor information in this case may be stored for each motor control device 10 in the user area that corresponds to the serial number of the motor control device 10, or may be stored for each motor 1 in the maker area or the user area that corresponds to the serial number of the motor 1. Each motor control device 10 obtains the motor information from the cloud server 60 via the controller 40 at arbitrary timing (for example, the time when control of the motor 1 is started). Alternatively, the motor control device 10 may obtain the motor information from the cloud server 60 via the motor control device maintenance terminal 20. In the case of the motor control device 10 that can be connected to the network N, the motor control device 10 may obtain the motor information directly from the cloud server 60.

The motor information managed on the cloud server 60 includes, for example, (1) the type of the motor 1 (a rotary type, a linear type, and the like), (2) model information of the motor 1 (the model number and the like), and (3) parameter information about the motor 1. As the parameter information, parameters suitable for the type of the motor 1 of interest are stored. In the case of a rotary type, for example, rated torque, rated power, rated rotational speed, instantaneous maximum torque, motor inertia moment, pole number, highest rotational speed, rated current, maximum current, d-axis inductance, and q-axis inductance are stored as the parameter information. In the case of a linear type, for example, maximum thrust, rated thrust, moving coil mass, rated speed, highest speed, pole pitch, rated current, maximum current, d-axis inductance, and q-axis inductance are stored as the parameter information.

A diversity of communication protocols can be applied to the transmission/reception of various types of data between an industrial machine that can be connected to the network N (for example, the controller 40) and the respective servers (for example, the cloud server 60). An example of the communication protocols that can be used is File Transfer Protocol (FTP).

For example, the function of an FTP client is installed in the industrial machine and the function of an FTP server is installed in the server. In this case, the server that is an FTP server waits for a communication connection request conforming to FTP from the industrial machine that is an FTP client. Once issuing the communication connection request to the server, the industrial machine can transfer data and a program that are stored in its own storage unit (for example, settings information of the industrial machine, firmware of the industrial machine, and logging data that is a record of the operation situation or the like of the industrial machine) to the server as a transfer target file to be recorded in the server-side storage unit. The industrial machine can further obtain data and a program that are stored in the server-side storage unit (for example, settings information of this or another industrial machine, and firmware of this or another industrial machine) as a transfer target file to be recorded in its own storage unit. The industrial machine can transfer data between its own storage unit and the server-side storage unit at arbitrary timing in this manner.

This embodiment also encompasses a case opposite to the one described above in which the function of an FTP server is installed in the industrial machine and the function of an FTP client is installed in the server. In this case, the industrial machine that is an FTP server waits for a communication connection request conforming to FTP from the server that is an FTP client. Once issuing the communication connection request to the industrial machine, the server can transfer data and a program that are stored in the server-side storage unit (for example, settings information of this or another industrial machine, and firmware of this or another industrial machine) to the industrial machine as a transfer target file to be recorded in the storage unit of the industrial machine. The server can further obtain data and a program that are stored in the storage unit or the industrial machine (for example, settings information of the industrial machine, firmware of the industrial machine, and logging data of the industrial machine) as a transfer target file to be recorded in its own storage unit. The server can transfer data between the server-side storage unit and the storage unit of the industrial machine at arbitrary timing in this manner.

In the case where a file transmitted/received in the manner described above is data that is stored in the user area of the product information, data registered in the user area by each user can be obtained by the industrial machine from the server, or can be transferred from the server to the industrial machine, at arbitrary timing. The document information described above and a portion of the document information may also be transmitted by the FTP protocol from the cloud server 60 to the maintenance-use portable terminal 30.

The embodiment described above is given as a concrete example, and is not to limit the invention disclosed herein to the very configuration and exemplary screens of these concrete examples. A person skilled in the art may make various modifications to these disclosed embodiments with regard to, for example, the shapes, counts, and arrangement of physical components, and screen design. It is to be understood that the technical scope of the invention disclosed herein encompasses such modifications. For instance, how roles are divided between the cloud server 60 and the maintenance-use portable terminal 30 is not limited to the one in the embodiment. The identification of the serial information, for example, may be performed on the cloud server 60. The maintenance-use portable terminal 30 in this case transmits a photographed image to the cloud server 60, for example. Some of the functions implemented by the cloud server 60 and of the functions implemented by the maintenance-use portable terminal 30 in the embodiment may be implemented by other devices that are included in the display control system S. To give a concrete example, the product information display screen, the document information display screen, and the error code input screen may be displayed on the motor control device maintenance terminal 20.

It should be understood by those skilled in the art that various modifications, combinations, sub-combinations and alterations may occur depending on design requirements and other factors insofar as they are within the scope of the appended claims or the equivalents thereof.

What is claimed is:

1. A display control system, comprising:
a document extracting device; and
a portable information terminal, whereby
the portable information terminal comprises:
an identification information obtainer that obtains identification information which is assigned in order to identify an industrial machine;
a serial information identifier that identifies, based on the obtained identification information, serial information which is assigned uniquely to the industrial machine; and
a serial information transmitter that transmits the serial information to the document extracting device, the document extracting device comprises:
- a serial information receiver that receives the serial information from the portable information terminal;
- an extraction target identifier that identifies as an extraction target a portion of document information accumulated in advance, based on the serial information; and
- an extractor that extracts the extraction target from the document information; and that the portable information terminal further comprises a display that displays what is extracted by the extractor; and wherein the extraction target identifier comprises:
- a document information identifier that identifies a document associated with the serial information; and
- an extracted portion identifier that identifies a portion of the identified document regarding the industrial machine that is associated with the serial information as an extraction target and wherein the extractor extracts the extraction target from the document information and transmitting the extraction target to the portable information terminal.

2. The display control system according to claim 1, wherein the extraction target identifier identifies, as an extraction target, out of the document information, a portion that is identified based on registration information, which is registered by a user of the industrial machine and which is stored in a storage in association of the serial information.

3. The display control system according to claim 1,
the document extracting device further comprises an error code obtainer that obtains an error code of the industrial machine, and
wherein the extraction target identifier identifies, as an extraction target, out of the document information, a portion that is identified based on a combination of the serial information and the obtained error code.

4. The display control system according to claim 1, wherein the identification information obtainer obtains the identification information in a form of an image.

5. A display control method comprising:
- obtaining identification information which is assigned in order to identify an industrial machine by a portable information terminal;
- identifying, based on the obtained identification information, serial information which is assigned uniquely to the industrial machine by the portable information terminal;
- transmitting the serial information to from the portable information terminal to a document extracting device;
- identifying as an extraction target a portion of document information accumulated in advance, based on the serial information by the document extracting device;
- extracting the extraction target from the piece of the document information by the document extracting device; and
- displaying what is extracted by the portable information terminal, wherein, in identifying the portion of document information;
- identifying a document associated with the serial information; and
- identifying a portion of the identified document regarding the industrial machine that is associated with the serial information as an extraction target; and wherein, in extracting the extraction target, extracting the extraction target from the document information and transmitting the extraction target to the portable information terminal.

6. A document extracting device, comprising:
- a serial information receiver that receives a serial information assigned to an industrial machine from a portable information terminal;
- an extraction target identifier that identifies, as an extraction target a portion of document information accumulated in advance, based on the serial information; and
- an extractor that extracts the extraction target from the document information, wherein the extraction target identifier comprises:
- a document information identifier that identifies a document associated with the serial information; and
- an extracted portion identifier that identifies a portion of the identified document regarding the industrial machine that is associated with the serial information as an extraction target; and wherein the extractor extracts the extraction target from the document information and transmitting the extraction target to the portable information terminal.

7. A portable information terminal, comprising:
- an identification information obtainer that obtains identification information which is assigned in order to identify an industrial machine;
- a serial information identifier that identifies, based on the obtained identification information, serial information which is assigned uniquely to the industrial machine;
- a serial information transmitter that transmits the serial information to a document extracting device; and
- a display that displays an extraction target that is extracted by the document extracting device based on the serial information, wherein the extraction target is a portion regarding the industrial machine that is associated with the serial information of a document associated with the serial information extracted from document information accumulated in advance by the document extracting device, and wherein the extraction target is transmitted from the document extracting device.

8. A non-transitory computer-readable information storage medium having stored thereon a program, the program causing a computer to function as:
- a serial information receiver that receives a serial information assigned to an industrial machine from a portable information terminal;
- an extraction target identifier that identifies, as an extraction target a portion of document information accumulated in advance, based on the serial information; and
- an extractor that extracts the extraction target from the document information, wherein the extraction target identifier comprises:
- a document information identifier that identifies a document associated with the serial information; and
- an extracted portion identifier that identifies a portion of the identified document regarding the industrial machine that is associated with the serial information as an extraction target; and wherein the extractor extracts the extraction target from the document information and transmitting the extraction target to the portable information terminal.

9. A non-transitory computer-readable information storage medium having stored thereon a program, the program for causing a computer to function as a portable information terminal comprising a display, the program causing the computer to function as:

an identification information obtainer that obtains identification information which is assigned in order to identify an industrial machine;
a serial information identifier that identifies, based on the obtained identification information, serial information which is assigned uniquely to the industrial machine;
a serial information transmitter that transmits the serial information to a document extracting device; and
a display processor that displays on the display an extraction target that is extracted by the document extracting device based on the serial information,
wherein the extraction target is a portion regarding the industrial machine that is associated with the serial information of a document associated with the serial information extracted from document information accumulated in advance by the document extracting device, and
wherein the extraction target is transmitted from the document extracting device.

* * * * *